United States Patent [19]

Suda

[11] Patent Number: 4,729,645
[45] Date of Patent: Mar. 8, 1988

[54] NON-SPHERICAL SINGLE LENS
[75] Inventor: Shigeyuki Suda, Tokyo, Japan
[73] Assignee: Canon Kabushiki Kaisha, Tokyo, Japan
[21] Appl. No.: 829,966
[22] Filed: Feb. 18, 1986
[30] Foreign Application Priority Data Feb. 19, 1985 [JP] Japan .................................. 60-31044

[51] Int. Cl.⁴ ............................................ G02B 13/18
[52] U.S. Cl. .................................................... 350/432
[58] Field of Search ................................... 350/432–435
[56] References Cited

U.S. PATENT DOCUMENTS 2,730,925 1/1956 Kavanagh ........................... 350/432
4,657,352 4/1987 Suda et al. ........................... 350/432

Primary Examiner—John K. Corbin
Assistant Examiner—Scott J. Sugarman
Attorney, Agent, or Firm—Fitzpatrick, Cella, Harper & Scinto

[57]         ABSTRACT

A non-spherical single lens comprises a first surface which is a non-spherical surface, the first surface being substantially zero in the curvature thereof near the optic axis and being of a non-spherical shape gradually displaced outwardly away from the optic axis, and a second surface which is a convex spherical surface of a radius of curvature r, $|r|$ being a value equal or approximate to d which is the thickness of the lens.

6 Claims, 7 Drawing Figures

NON-SPHERICAL SINGLE LENS

BACKGROUND OF THE INVENTION

1. Field of the Invention

This invention relates to a lens used to condense or collimate substantially monochromatic light emitted from a laser or an LED, and in particular to a non-spherical single lens whose NA is up to the order of 0.35 and in which correction of aberrations is effected over a relatively wide field of view.

2. Related Background Art

Non-spherical single lenses have heretofore been proposed in Japanese Laid-open patent application Nos. 64714/1982, 201210/1982, 1983 (U.S. counterpart is U.S. Pat. No. 4,415,238) and Japanese Laid-open patent application No. 68711/1983. However, any of these propositions is designed chiefly as an objective for an optical head. Accordingly, in these lenses, correction of aberrations is effected only in a very slight range on and near the axis, and where these are used, for example, as collimators, aberrations are created unless a light source is disposed at a very much limited position the focus position on the optic axis of the lens, and thus, great pains have often been bestowed on assembly, adjustment, etc.

SUMMARY OF THE INVENTION

It is an object of the present invention to provide a non-spherical single lens in which correction of aberrations is effected over a much wider field of view than in the conventional non-spherical single lenses, thereby alleviating the need for such great care in accuracy of assembly and adjustment.

In the non-spherical single lens according to the present invention, where the single lens is used at a reduction magnification, a first surface as viewed from the object side from which a light beam enters the single lens toward the image side is a non-spherical surface and a second surface is a spherical surface of a radius of curvature r which is convex toward the image side, and said non-spherical surface is of such a non-spherical shape that the curvature thereof near the optic axis is substantially zero and the surface protrudes toward the object side away from the optic axis. That is, the shape of the non-spherical surface is a shape in which as a whole, a concave surface faces the object side, and the amount of displacement from a plane perpendicular to the optic axis increases away from the optic axis. Further, if the on-axis thickness of the lens is d, the absolute value of the radius of curvature r is equal or approximate to d, whereby there is obtained a non-spherical single lens which achieves the above object.

DESCRIPTION OF THE PREFERRED EMBODIMENTS

Figure 1:
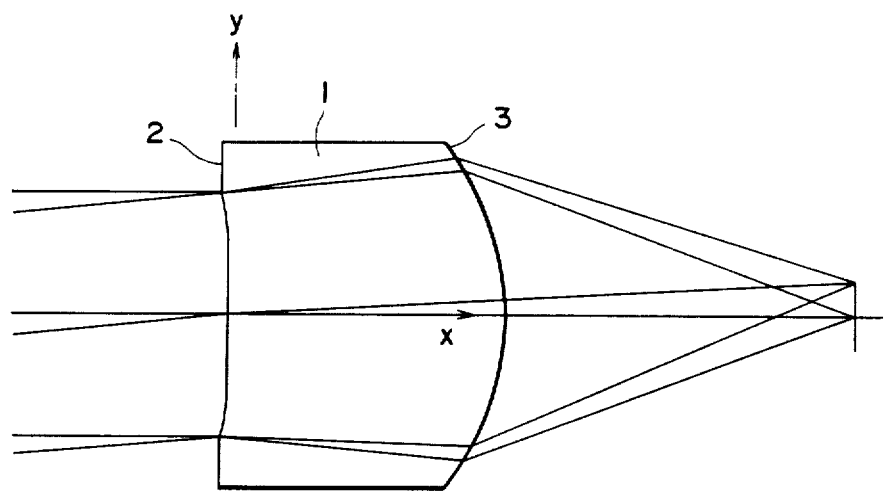
FIG. 1 is a cross-sectional view of a non-spherical single lens according to an embodiment of the present invention.

FIG. 1 shows a cross-section of a non-spherical single lens according to an embodiment of the present invention, and also shows the optical path when the non-spherical single lens is used as a condensing lens in a device such as a compact disk or an optical disk. Accordingly, there is shown a case where the non-spherical single lens is used at a reduction magnification, and if the light beam incidence side of the lens is generally represented as the object side, the object side surface 2 of the lens is a non-spherical surface and the image side surface 3 of the lens is a spherical surface. In the case of the use converse to that shown in FIG. 1, that is, in a case where the non-spherical single lens is used at an enlargement magnification as the collimator of a semiconductor laser or the like, the spherical surface 3 is the object side surface and the non-spherical surface 2 is the image side surface.

The non-spherical single lens according to the present invention, unlike a lens such as an objective for an optical head which is directed to the correction of only the aberrations on and near the axis and in which chiefly spherical aberration and coma need only be eliminated, requires that astigmatism also be eliminated in order that a good imaging performance may be maintained over a relatively wide field of view.

The present invention will hereinafter be described in detail by the use of the method of discription described in detail in *The Lens Design* (written by Matsui and published by Kyoritsu Publishing Co., Ltd.).

According to the description in the same book, the third-order aberration coefficients I, II, III, IV and V for a spherical surface can be expressed as:

$$I(\text{spherical aberration coefficient}) = h(hQ)^2 \left\{ h\Delta \left( \frac{1}{NS} \right) \right\} \quad (1)$$

$$II(\text{coma coefficient}) = h(hQ) \overline{(hQ)} \left\{ h\Delta \left( \frac{1}{NS} \right) \right\} \quad (2)$$

$$III(\text{astigmatism coefficient}) = h\overline{(hQ)}^2 \left\{ h\Delta \left( \frac{1}{NS} \right) \right\} \quad (3)$$

$$IV(\text{sagittal plane curvature}) = III + P \left( P = -\frac{1}{r} \Delta \left( \frac{1}{N} \right) \right) \quad (4)$$

$$V(\text{distortion}) = \overline{h(hQ)^2} \left\{ h\Delta \left( \frac{1}{NS} \right) \right\} + \overline{(hQ)} \left\{ h\Delta \left( \frac{1}{NS} \right) \right\} \quad (5)$$

where h is the height of incidence of the light ray onto the surface, Q is the invariable amount of Abble, N and N' are the refractive indices of the medium, $\bar{h}$ and $\bar{Q}$ are the heights of incidence and the invariable amount of Abbe, respectively, regarding the principal ray, r is the radius of curvature of the spherical surface, and S and S' are the distances from the spherical surface to the object and the image, respectively.

From the paraxial imaging formula $$\frac{N'}{S'} = \frac{N' - N}{r} + \frac{N}{S}, \quad (6)$$

$$\frac{1}{N'S'} = \frac{N' - N}{N'^2} \left( \frac{1}{r} \right) + \frac{N}{N'^2} \left( \frac{1}{S} \right) \quad (7)$$

and therefore $$\Delta\left(\frac{1}{NS}\right)$$

shown above is expressed as $$\Delta\left(\frac{1}{NS}\right) = \frac{1}{N'S'} - \frac{1}{NS} = \frac{N'-N}{N'^2} \frac{1}{r} + \quad (8)$$

$$\left(\frac{N}{N'^2} - \frac{1}{N}\right)\frac{1}{S}.$$

If this is applied particularly to the first surface of the single lens, $$\Delta_1\left(\frac{1}{NS}\right) = \frac{n-1}{n^2} \frac{1}{r_1} + \left(\frac{1}{n^2} - 1\right)\frac{1}{S1}, \quad (9)$$

(where the suffix 1 of $\Delta_1$ indicates that is belongs to the first surface). This is because the object side of the first surface of radius $r_1$ is air (N=1) and the image side thereof is the material (N'=n) of the single lens.

Accordingly, when, as shown in FIG. 1, a substantially parallel light beam is incident on the single lens 1, $S1 = \sim$ and therefore, by the radius of curvature of the first surface being $r_1 = \sim$, there can be obtained $$\Delta_1\left(\frac{1}{NS}\right) = 0.$$

That is, when the curvature of the first surface is zero, if a parallel light beam is incident on the first surface, from equations (1)–(3) above, the values of spherical aberration $I_1$, coma $II_1$ and astigmatism $III_1$ created in the first surface are $I_1 = II_1 = III_1 = 0$ (in the case of the incidence of a parallel light beam).

Also, if the position of the pupil of the lens 1 is made coincident with the position of the first surface 2 and the radius of curvature r of the second surface 3 which is a convex surface facing the image side is set so as to be equal to the on-axis thickenss d of the lens, the pupil paraxial ray passing through the center of said pupil corresponds to a case where it is incident on the second surface from the center of curvature of the second surface 3 and therefore, this pupil paraxial ray is not refracted by the second surface 3, but emerges from the second surface 3 toward the image side. That is, by the distance t between the second surface 3 and the pupil being $|t| = d$ ($-t=d$), $$\bar{Q} = N'\left(\frac{1}{r} - \frac{1}{t}\right) \quad (10)$$

and therefore, by $-r$ being $-r=d$, r becomes $r=t$ and thus, $\bar{Q}$ shown in equation (10) is $\bar{Q}0$. It should be noted that r is a value including a sign, and the position of the center of curvature thereof lies on the first surface 1 and exists more adjacent to the object side than the surface 3 and therefore, r is a negative value. At this time, as is apparent from equations (2) and (3), coma $II_2$ and astigmatism $III_2$ which are the off-axis aberrations in the second surface 3 are $$II_2 = III_2 = 0.$$

However, in the second surface 3, as can be seen from equation (1), spherical aberration $I_2$ cannot be zero in the above-described construction, and therefore, a non-spherical surface is introduced into the first surface 2, spherical aberration $I_1$ is caused to be created in the first surface 2 and $I_1$ is rendered into $I_1 = -I_2$, whereby spherical aberration is corrected. Even if a spherical surface is introduced into the first surface 2, the incidence height $\bar{h}_1$ of the pupil paraxial ray is $\bar{h}_1 = 0$ and therefore, as can be seen from equations (2) and (3), coma $II_1$ and astigmatism $III_1$ created in the first surface can be made to remain to be of the value of $II_1 = III_1 = 0$.

A method of negating spherical aberration will now be described.

When as a form representing the shape of the non-spherical surface which is the first surface 2, for the sake of convenience, the x-axis is chosen coincidently with the direction of travel of light on the optic axis and the y-axis is chosen so as to be orthogonal thereto and pass through the vertex of the first surface 2 (see FIG. 1), it is to be understood that the amount of displacement $\Delta x$ from the spherical surface at a point whereat the y-coordinates are H is $$\Delta x = BH^4 + CH^6 DH^8 + EH^{10},$$

where B, C, D and E are non-sphericity coefficients representative of degrees of non-sphericity. In order to negate the spherical aberration $I_2$ in the second surface 3 by the spherical aberration $I_1$ in the first surface 2, the non-sphericity coefficient B of the first surface 2 is first set to $$B = -I_2/8(n-1)f^3.$$

Here, $I_2$ is generally a positive value and therefore, B is a negative value and by this, it is seen that the shape of the non-spherical surface which is the first surface 2 must be a shape displaced toward the object side. Next, the non-sphericity coefficients C, D and E are determined so as to eliminate any residual spherical aberration. Thereby, a lens in which spherical aberration, coma and astigmatism are corrected can be embodied in practice.

In the foregoing description, it has been shown that spherical aberration, coma and astigmatism can be completely eliminated if the value r of the radius of curvature of the second surface 3 is made coincident with the on-axis thickness d of the lens 1, whereas these aberrations need not always be completely eliminated, but if the relation between d and r is within the range of value of $$-1.1d < r < -0.9d,$$

there will be obtained a lens in which aberrations are sufficiently corrected in practical use. As can be seen from equation (10), if the relation between r and d departs from this range, correction of aberrations, particularly, coma, will become difficult and it will be difficult to obtain a single lens usable at a wide angle of view.

Figure 2A:
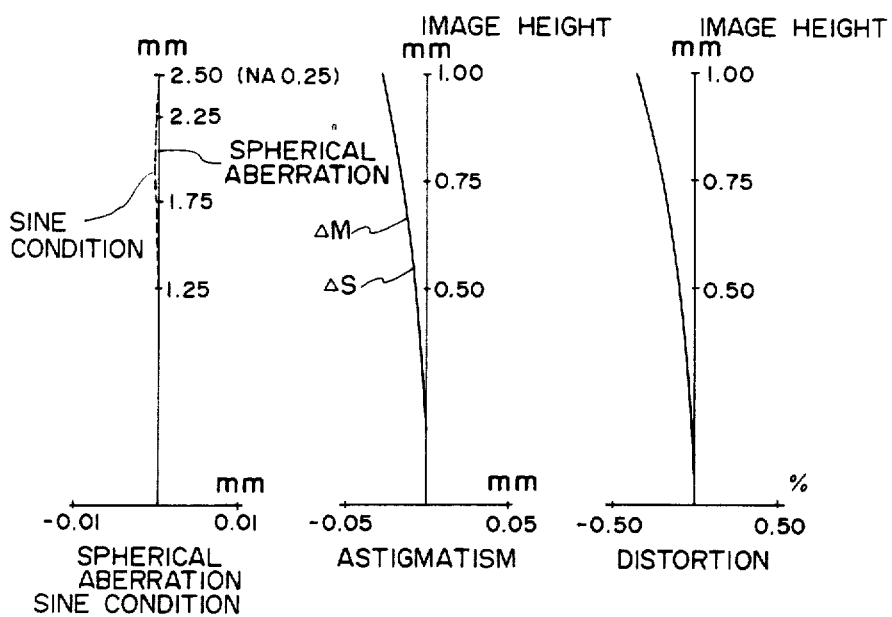
FIGS. 2A, 2B, 3A, 3B, 4A and 4B show various aberrations in respective embodiments of the non-spherical single lens according to the present invention.
Figure 2B:
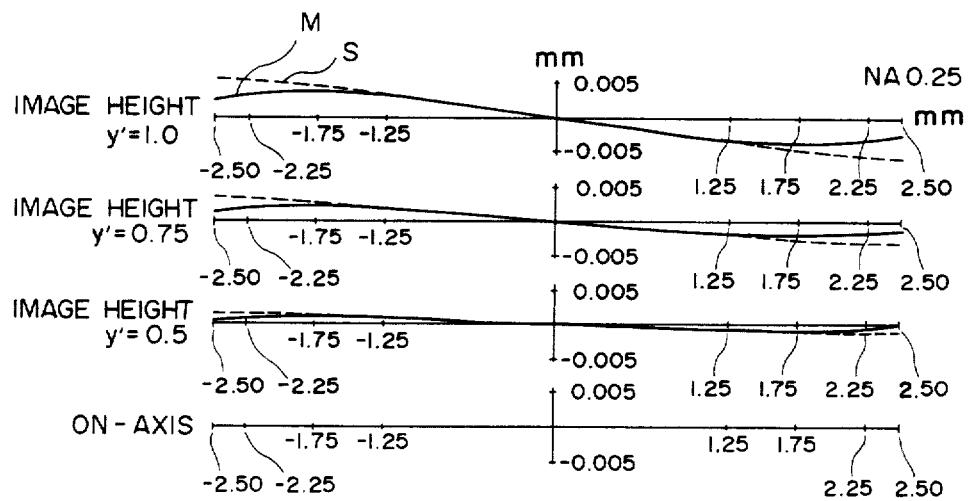
Figure 3A:
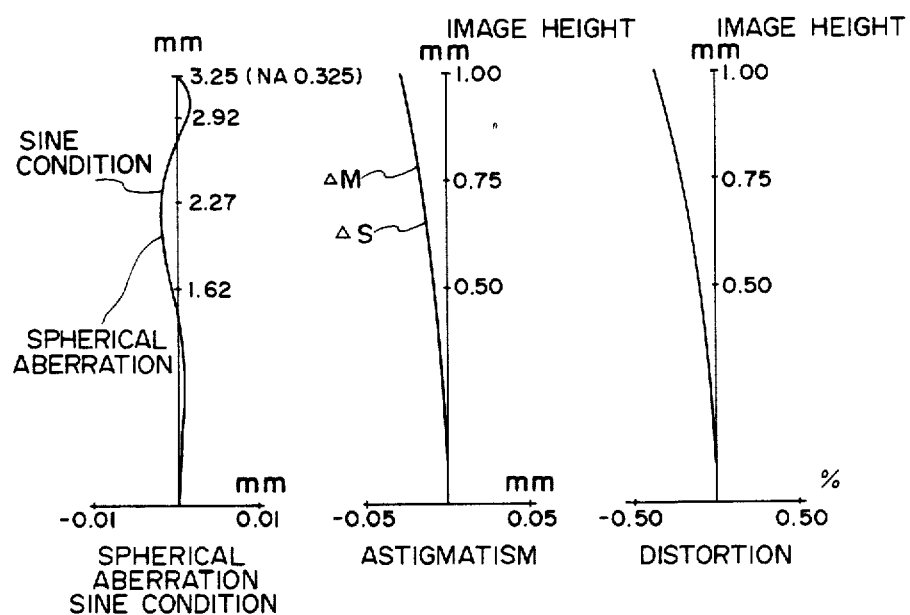
Figure 3B:
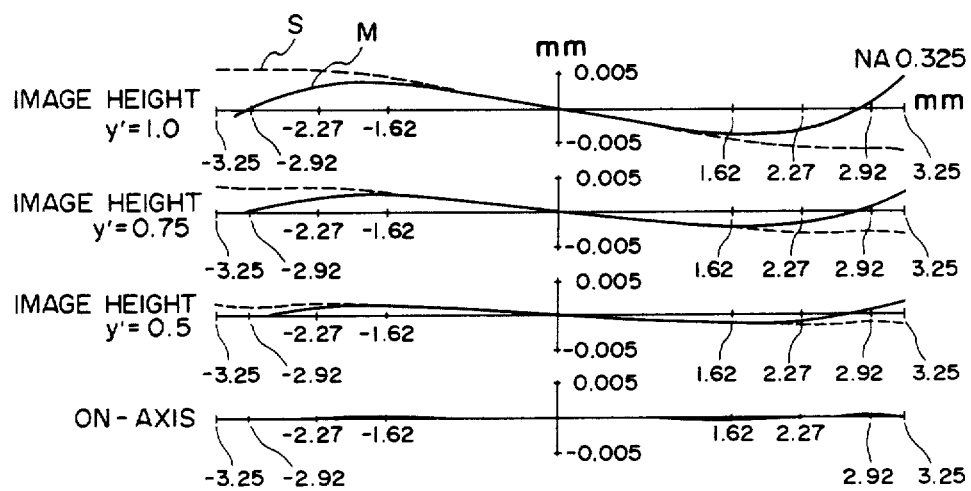
Figure 4A:
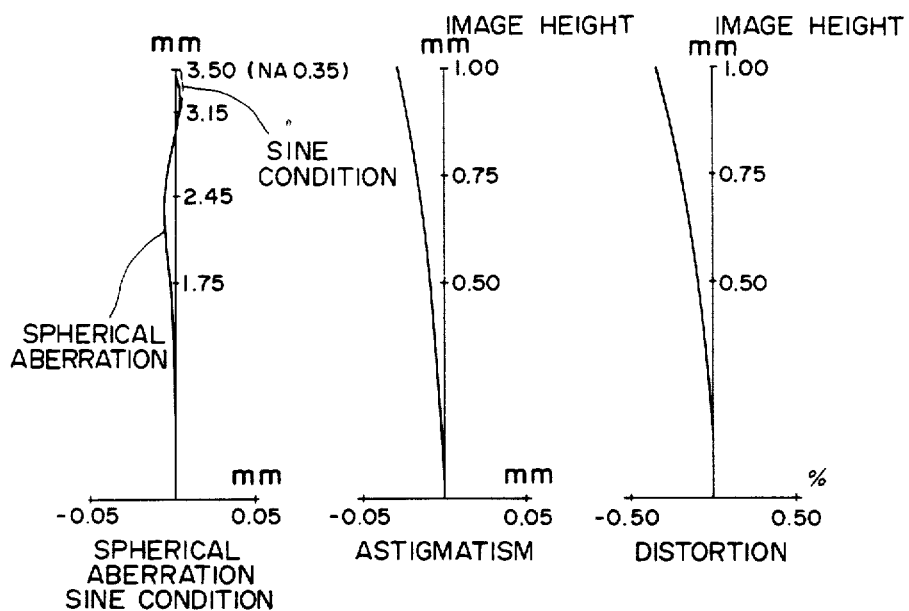
Figure 4B:
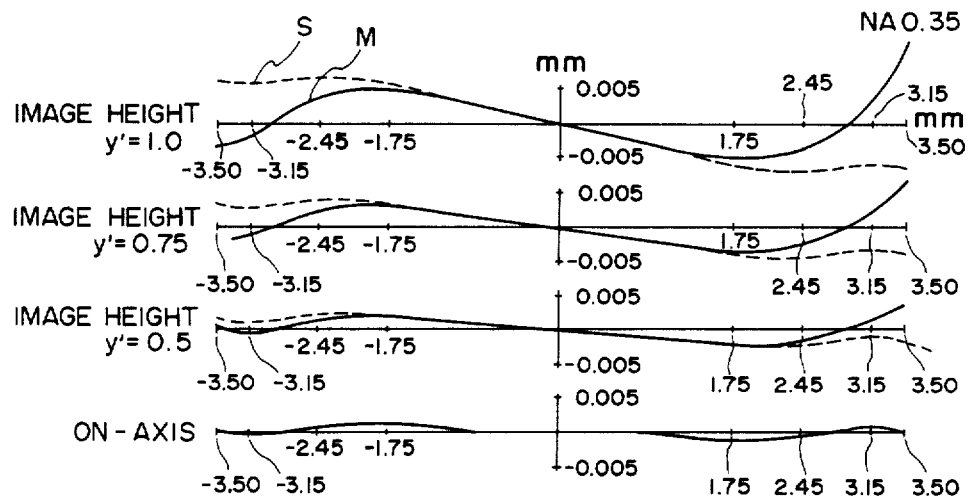

Three embodiments of the non-spherical single lens according to the present invention will be shown below. In the lists below, f is the focal length of the lens, NA is the numerical aperture, r1 is the radius of curvature of the first surface near the optic axis, r2 is the radius of curvature of the second surface, d is the on-axis thickness of the lens, and n is the refractive index of the lens. Further, B, C, D and E are the non-sphericity coefficients of the first surface, I is spherical aberration, II is coma, III is astigmatism, I* is annular spherical aberration, II* is annular coma, and P is Petzval sum. The vertical aberration in Embodiment 1 is shown in FIG. 2A, the lateral aberration in Embodiment 1 is shown in FIG. 2B, the vertical aberration in Embodiment 2 is shown in FIG. 3A, the lateral aberration in Embodiment 2 is shown in FIG. 3B, the vertical aberration in Embodiment 3 is shown in FIG. 4A, and the lateral aberration in Embodiment 3 is shown in FIG. 4B. In FIGS. 2B, 3B and 4B, solid lines (meridional) are approximately symmetrical about the origin and dotted lines (sagittal) are perfectly symmetrical.

---

Embodiment 1

$f = 10$  $NA = 0.25$
$r1 = \infty$  $r2 = -8.0593$
$d = 8.0593$  $n = 1.80593$
$B = -7.78789 \times 10^{-4}$
$C = -1.47206 \times 10^{-5}$
$D = -3.17439 \times 10^{-7}$
$E = -1.77517 \times 10^{-8}$
$I = II = III = I^* = II^* = 0$
$P = 0.55373$

---

Embodiment 2

$f = 10$  $NA = 0.325$
$r1 = \infty$  $r2 = -8.0593$
$d = 8.0593$  $n = 1.80593$
$B = -7.78789 \times 10^{-4}$
$C = -1.47206 \times 10^{-5}$
$D = -2.42841 \times 10^{-7}$
$E = -2.57976 \times 10^{-8}$
$I = II = III = I^* = II^{**} = 0$
$P = 0.55373$

---

Embodiment 3

$f = 10$  $NA = 0.35$
$r1 = \infty$  $r2 = -8.0593$
$d = 8.0593$  $n = 1.80593$
$B = -7.78789 \times 10^{-4}$
$C = -1.47206 \times 10^{-5}$
$D = -1.73082 \times 10^{-7}$
$E = -3.16602 \times 10^{-8}$
$I = II = III = I^* = II^* = 0$
$P = 0.55373$

---

I claim:

1. A non-spherical single lens comprising:
a first surface which is a non-spherical surface, said first surface being substantially zero in the curvature thereof near the optic axis and being of a non-spherical shape gradually displaced outwardly away from the optic axis; and
a second surface which is a convex spherical surface of a radius of curvature r, $|r|$ being a value equal or approximate to d which is the thickness of said lens to such an extent that off-axis aberrations are sufficiently corrected for practical use.

2. A non-spherical single lens according to claim 1, wherein $-1.1d < r < 0.9d$.

3. A non-spherical single lens according to claim 1, wherein the non-spherical shape of said first surface has its non-sphericity coefficient determined so as to eliminate the spherical aberration in said second surface.

4. A non-spherical single lens according to claim 3, wherein when an x-axis is plotted in a direction coincident with the optic axis and going from the outside toward the inside in said first surface and a y-axis is plotted in a direction orthogonal thereto and passing through the vertex of said first surface, said first surface has such a shape that the amount of displacement $\Delta x$ from the spherical surface at H of the y coordinates is represented by $$\Delta x = BH^4 + CH^6 + DH^8 + EH^{10}$$

(B, C, D and E are non-sphericity coefficients representative of degrees of non-sphericity) and when the spherical aberration in said second surface is $I_2$ and the focal length and the refractive index of said non-spherical single lens are f and n, respectively, the non-sphericity coefficient B is set to $$B = -I_2/8(n-1)f^3.$$

5. An optical system for converting a parallel light beam into a convergent light beam, comprising:
a first surface for receiving the parallel light beam;
a second surface for emitting the convergent light beam; and
a medium contained between said first surface and said second surface for transmitting the light beam from said first surface to said second surface;
wherein said first surface is composed of a non-spherical surface in which the curvature thereof near the optic axis is substantially zero and which is gradually displaced outwardly away from the optic axis, said first surface is disposed at or in the vicinity of a pupil of said optical system and the center of curvature of said second surface is positioned at or in the vicinity of said first surface.

6. An optical system for converting a divergent light beam into a parallel light beam, comprising:
a first surface for receiving the divergent light beam;
a second surface for emitting the parallel light beam; and
a medium contained between said first surface and said second surface for transmitting the light beam from said first surface to said second surface;
wherein said first surface is an outwardly convex surface, said second surface is composed of a non-spherical surface in which the curvature thereof near the optic axis is substantially zero and which is gradually displaced outwardly away from the optic axis, said second surface is disposed at or in the vicinity of a pupil of said optical system and the center of curvature of said first surface is positioned at or in the vicinity of said second surface.

* * * * *

UNITED STATES PATENT AND TRADEMARK OFFICE
CERTIFICATE OF CORRECTION

PATENT NO. : 4,729,645
DATED : March 8, 1988
INVENTOR(S) : SHIGEYUKI SUDA

Sheet 1 of 2

It is certified that error appears in the above-identified patent and that said Letters Patent is hereby corrected as shown below:

COLUMN 1, line 15, ", 1983" should read --, and 17409/1983--;

line 23, "position the" should read --position near the--.

COLUMN 3 line 30, "∿" should read -- ∞ --;

line 31, "∿" should read -- ∞ --;

line 63, "$\bar{Q}0$" should read --$\bar{Q}=0$--.

COLUMN 4, line 29, "$\Delta x = BH^4 + CH^6 DH^8 + EH^{10}$" should read --$\Delta x = BH^4 + CH^6 + DH^8 + EH^{10}$--.

COLUMN 5, line 6, "$\overset{*}{I}$" should read --I--; same line, "$\overset{*}{II}$" should read --II--;

UNITED STATES PATENT AND TRADEMARK OFFICE
CERTIFICATE OF CORRECTION

PATENT NO. : 4,729,645
DATED : March 8, 1988
INVENTOR(S) : SHIGEYUKI SUDA

Sheet 2 of 2

It is certified that error appears in the above-identified patent and that said Letters Patent is hereby corrected as shown below:

COLUMN 5, line 7, "I" should read --$\overset{*}{\text{I}}$--;
line 8, "II" should read --$\overset{*}{\text{II}}$--.

Signed and Sealed this

Twenty-first Day of June, 1988

Attest:

DONALD J. QUIGG

*Attesting Officer*   *Commissioner of Patents and Trademarks*